C. W. DAVIS.
JUNCTION BOX FOR ELECTRICAL CONDUCTORS.
APPLICATION FILED MAR. 24, 1909.
1,093,607.
Patented Apr. 21, 1914.
3 SHEETS—SHEET 1.
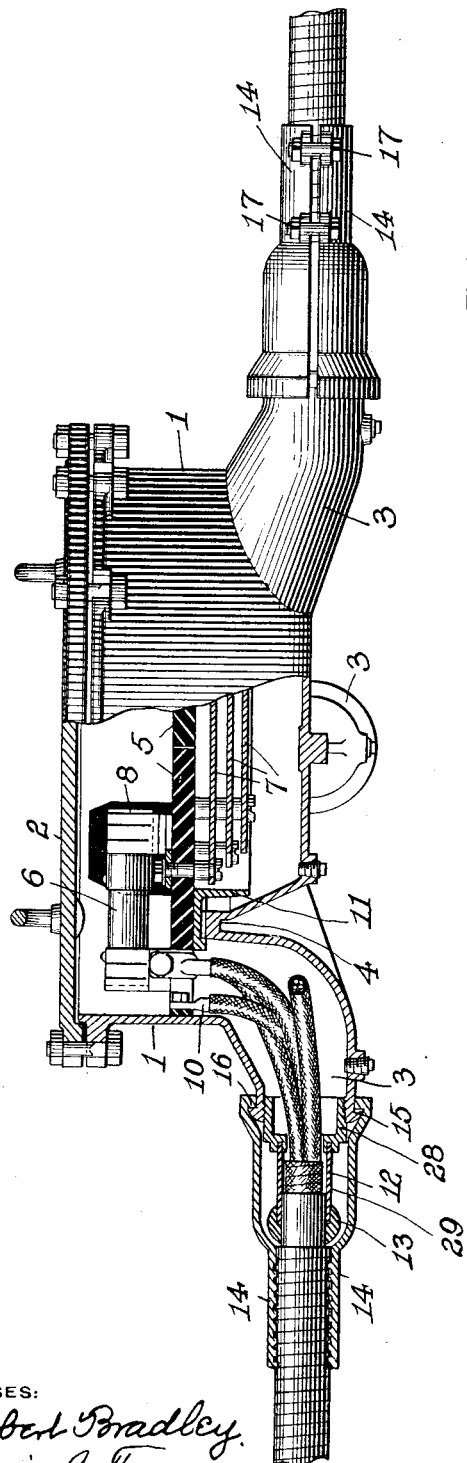
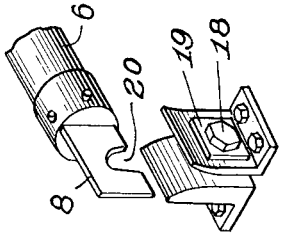
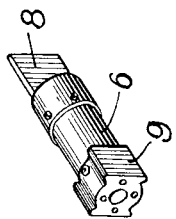
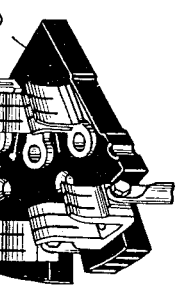
WITNESSES:
J. Herbert Bradley
Francis J. Tomasson
INVENTOR
Charles W. Davis
by Christy and Christy
Atty's

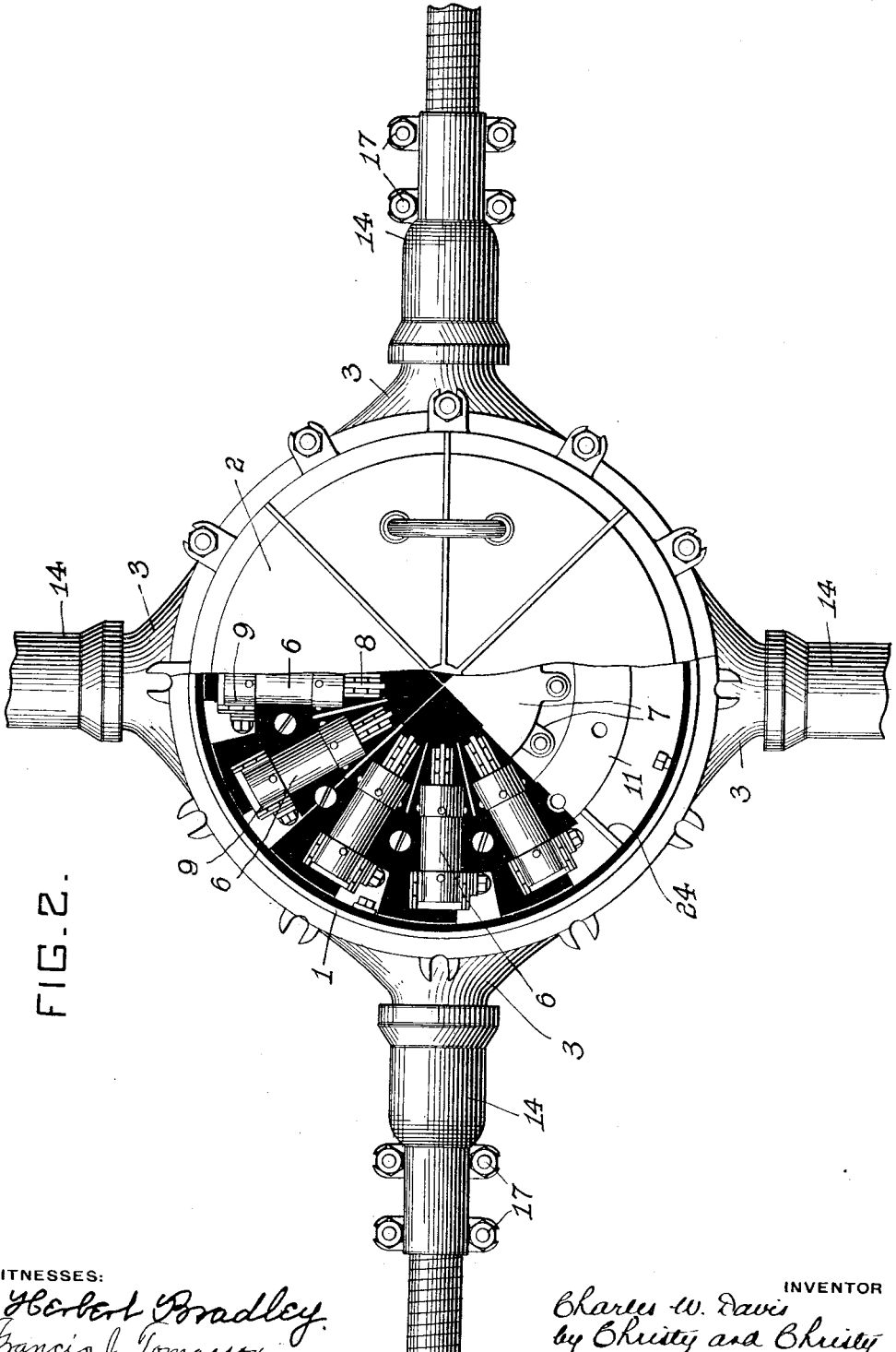

C. W. DAVIS.
JUNCTION BOX FOR ELECTRICAL CONDUCTORS.
APPLICATION FILED MAR. 24, 1909.

1,093,607.

Patented Apr. 21, 1914.
3 SHEETS—SHEET 3.

WITNESSES:

INVENTOR

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURGH, PENNSYLVANIA, A CORPORATION OF PENNSYLVANIA.

JUNCTION-BOX FOR ELECTRICAL CONDUCTORS.

1,093,607. Specification of Letters Patent. Patented Apr. 21, 1914.

Application filed March 24, 1909. Serial No. 485,476.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Junction-Boxes for Electrical Conductors, of which improvements the following is a specification.

My invention relates to improvements in junction boxes for electrical conductors, and the objects of my improvements are facility in assembling, compactness, efficiency and durability, and many specific practical advantages which will be apparent to one familiar with this art.

My invention is illustrated in the accompanying drawings.

Figure 5:
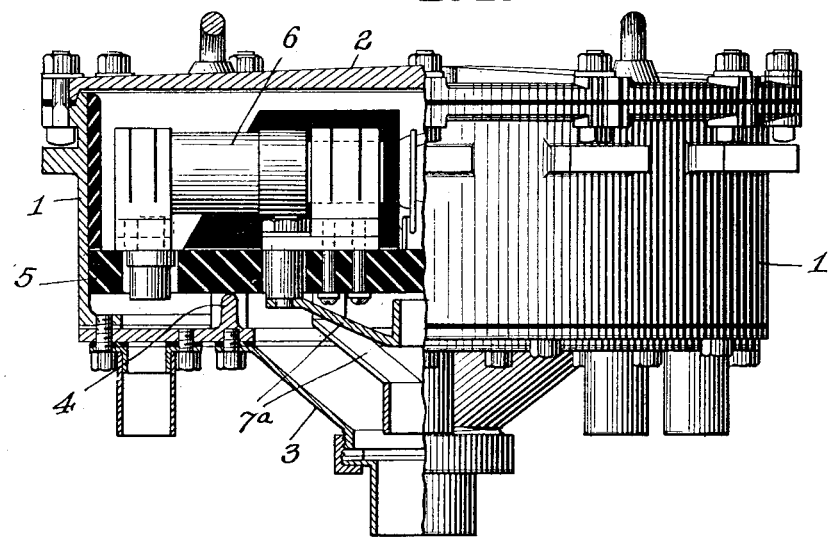
Figure 6:
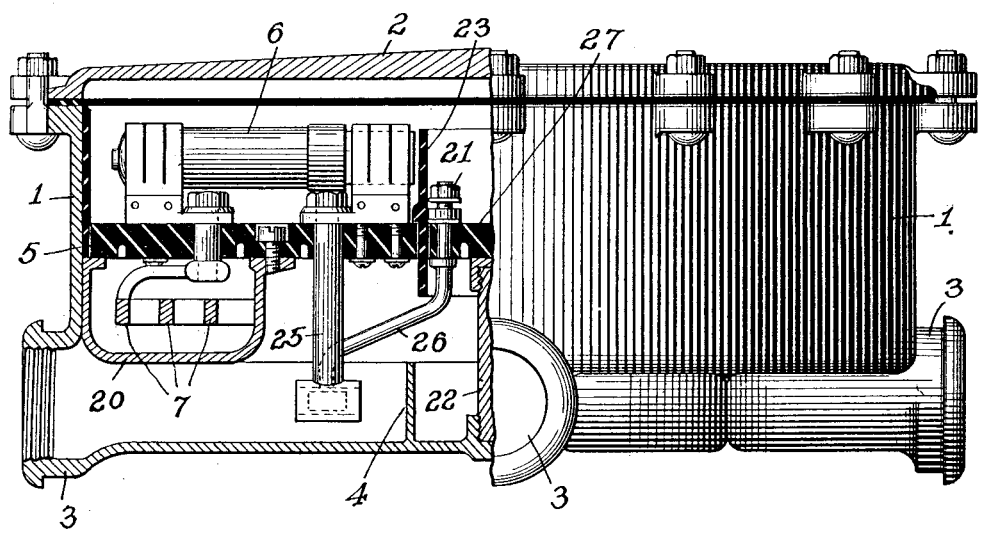

Figure 1 is a view partly in elevation, partly in central vertical section of my improved junction box; Fig. 2 is a plan view of the same structure; Figs. 3 and 4 are views in perspective of detached details; Figs. 5 and 6 are views similar to Fig. 1, illustrating certain modifications; Fig. 7 is a view in perspective of a structural detail.

The same numerals are used throughout to designate parts which reappear in the several figures.

The particular kind of junction box with which I am here primarily concerned is what may be termed a distributing box; that is, one within which the current carried by a supply cable is distributed and led out through a plurality of independent lines. Within such a junction box the contacts are ordinarily made through fuses, a well-known safety device in all such work. In certain details my improvements have a more general application, as I shall hereinafter show, but primarily all have to do with such a current distributing junction box.

The junction box shown in Figs. 1 and 2 is cylindrical, with a detachable cover plate 2, which when applied may be bolted in place, the joint being packed to prevent the ingress of moisture, in well-known manner. The bottom of this cylindrical junction box is of somewhat irregular form, its symmetry being broken by orifices 3, formed for the leading in and out of the conductors, and by inwardly extending supports 4 to sustain in proper position the contained parts.

Within the box is a plate 5 which carries the contacts and is in turn carried by the supports 4. This plate 5 is preferably formed wholly of insulating material, such as slate or porcelain; but it is only essential that it be of insulating material in such parts as to prevent leakage of the currents carried. Secured in the upper face of plate 5 are the contacts for the opposite terminals of a series of cartridge fuses 6, and beneath the plate these contacts are at one end united with a series of bus-bars 7, and at the opposite end provision is made for uniting the incoming and outgoing conductors. The particular arrangement of these cartridge fuses and their contact pieces upon the plate 5 is a feature of invention. I dispose the cartridge fuses (which are preferably cylindrical bodies) radially about the center of the box; the contacts for the inner ends are knife-blade contacts, a knife-blade 8 being formed at one end of the cartridge fuse. The contacts for the outer ends of these cartridge fuses are the yoke contacts illustrated; electric continuity being had in this case not through a longitudinal prolongation of the structure, but through contact plates 9, built out laterally on the outer ends of the cartridge fuses. In both cases the members carried by the plate 5 to engage the cartridge fuses make binding contact by spring pressure, as is usual in such structures. By such radial arrangement of the fuses and such specific forms of contact, I economize space, employ fuses of relatively great cubical contents within a relatively small space, and obtain a compact and simple structure.

It will be observed in examining Figs. 1, 3 and 4 that the plate 5 extends out to the cylindrical wall 1 of the junction box, and, but for the peripheral recesses provided for making the contacts, covers over and incloses a chamber formed between the supporting flange 4 and the outer wall of the box—a chamber into which the orifices 3 open. From within this chamber the incoming and outleading conductors will be placed in connection with the fuse contacts. When this has been done, it will be good practice to fill the chamber with an insulating substance such as is ordinarily applied in fluid state; and for such insulation so applied my structure is peculiarly adapted. Ordinarily in such installations, where a filling of insulation is introduced, any extended surface of the insulation is a point of weakness, for dust collecting upon such surface is apt to provide a leakage path for the flowing current; but in this case, the chamber thus filled being substantially closed above, and the insulating compound being applied to fill the whole chamber, the surface upon which dust might otherwise collect is restricted, and the security of the box against leakage is increased to a corresponding degree. While I have spoken of this peripheral space as a single chamber, I preferably divide it by partitions 24 into as many separate chambers as there are peripheral orifices. In high voltage work it may be desirable to fill the central space also, within the walls 4 and beneath plate 5 in which the bus-bars 7 lie, with insulating compound.

The box illustrated in Figs. 1 and 2 is provided with four orifices for introducing and leading out wires; it will be understood that any number of such orifices may be provided to meet particular conditions. In this box, chosen for purposes of illustration, through one of the four orifices a feeding cable is brought in, and through the remaining three orifices the subdivided and distributing current of the feeding cable is led out through service cables. The feeding cable contains three independent current-bearing conductors and a neutral, and each of the outward leading or service cables also contains three independent conductors and a neutral. In order to distribute the current of the feeding cable conductors to like phase conductors of the service cables, the plate 5 carries twelve distinct lines of current flow through twelve independent cartridge fuses. These twelve cartridge fuses, arranged in groups of three, each connected at their outer ends to one of the conductors of the cable, while the inner contacts of the twelve fuses are connected to the bus-bars 7 one from each of the four groups of fuses being connected to one of the three bus-bars. The neutral strand 10 of each cable is secured to a binding post in the wall of the box. Thus it will be seen that the current of each independent conductor of the feeding cable may be subdivided in the junction box and led out in three divergent lines. And it will be understood from this detailed explanation that my arrangement of orifices, bus-bars, and cartridge fuses permits of rearrangement and combination to unlimited extent to meet particular conditions.

For convenience in assembling and repairs, I preferably divide the plate 5 into as many sector-shaped parts as there are orifices 3, that each part with its own cartridge fuses may be independently removed to give access to any one of the orifices and any one of the cables without disturbing the others. As illustrated in Fig. 2, one of the four sector-shaped divisions of plate 5 has been removed. However, that when desired all of the plate 5 with its contacts may be removed together, I preferably provide a ring like member 11, resting immediately upon the support 4 and bearing in turn the divided plate 5. It is with like purpose that the peripheral chamber beneath plate 5 is subdivided by the partitions 24—that each cable end may be independently accessible.

The modification shown in Fig. 5 consists in the arrangement of all the cable orifices in the lower head of the cylindrical box, and in providing a central orifice for the feeding cable and peripheral orifices for the outward leading cables. In this arrangement it will be understood that the direction of the flow of current through the cartridge fuses is from the center of the junction box to its periphery, and that the chamber, within which the incoming conductors may be immersed in insulating compound, beneath a covering plate, is a centrally arranged chamber and not a peripheral one. The leads-out however may also be immersed in insulating compound, applied to fill the peripheral space outside of the supporting wall 4 and beneath plate 5. 7ª are bus-bars; they have central circular openings where connection is made with the feeding-in conductors.

In Fig. 6 a further modification is shown. The orifices are all peripheral, as in the box of Fig. 1, but the arrangement is such that the conductors of the connecting cables are carried to the center, and the bus-bars are arranged to be connected with the outer ends of the cartridge fuses and are inclosed in a chamber formed by a peripheral trough-shaped casting 20 carried upon the supports 4 and closed above by the plate 5. It will be observed that in this case the plate 5 is carried upon the trough 20 which in turn rests upon the supports 4. Further, there is here a central circular orifice through plate 5, and within this orifice is a small plate 27 (in effect a continuation of plate 5), conveniently carried on a post 22 secured in the bottom of the box. The plate 27 carries binding posts 21 for the neutral lines of the cables. In this box the cable strands or conductors which carry the supply currents are sweated into bushings carried on the ends of conductors 25 which are electrically united with the spring-jacks for the knife-blades of the inner ends of the cartridge fuses, and the neutral strands are sweated into bushings carried on the ends of conductors 26 carried in plate 27. These conductors 26 may conveniently be continued in binding posts 21 above plate 27, and the individual binding posts connected together. To prevent leakage, a screen 23 of insulating material extends between the binding posts 27 and the spring-jacks for the inner ends of the cartridge fuses. It will be apparent that in the space beneath plates 5 and 27 in the box of Fig. 6 insulating compound may be applied to any desired depth. In high voltage work it may be desirable to fill the trough containing the bus-bars 7 with insulating compound.

In Figs. 1 and 2 I have shown certain improvements in means for introducing an armored, lead sheathed cable into the junction box. An armored cable is the ordinary lead-sheathed cable with an outer covering of steel ribbon wound upon it to afford protection against injury to the relatively soft body within. In connecting up such a cable with the junction box, the armor covering must first be stripped away, then the lead sheath, then the insulation, and finally the contained conductors are laid bare and the desired connections made. The lead sheath must be secured in the orifice in the wall of the box. It is old practice to carry the sheathed cable through a closely fitting orifice and run solder in the joint; but such a joint is insecure; and a better way is to secure a bushing or thimble in the orifice and when the sheathed cable is threaded in to make a wiped solder joint upon thimble and cable sheath.

Having regard now to the particular construction shown in Fig. 1, the proper way of assembling is to introduce the end of the cable (previously prepared) through the orifice in the wall of the junction box and to make the electrical connections within; then, drawing the protruding cable outward, to take up the slack, and thus bringing the parts to position, to make the wiped solder joint 13 upon the bushing 12 in the orifice and the cable sheath. A practical difficulty with this seemingly simple procedure is that it is almost impossible to make a wiped solder joint upon an ordinary thimble so inserted because the heat is conducted away so rapidly into the body of the structure. Accordingly, I employ a bushing of two metals; having a body portion 28 of such hardness (as copper or bronze) as to be properly secured in the orifice 3, and an extension 29 of such low heat conductivity (as lead) as to afford a proper base for the joint. This particular construction is described in detail in my Patent No. 1,061,527, and also in my co-pending application, filed February 15, 1913, Serial No. 748,720, which is a division of my present application. I here describe my preferred mode of making such a bi-metallic thimble, for it is new with me, and is practically valuable. The annulus of soft metal 29 is seated (as may be seen in Fig. 1 of the drawings,) in an annular groove or channel in the harder body portion 28. These two parts are first formed independently. The body portion is sustained in position with the groove uppermost, heated to a sufficient degree, and molten solder introduced in the groove. The annulus of soft metal is then applied, immersed edge-wise in the solder bath. The parts then cool and harden to a secure structure, efficient for the purpose, and may be conveniently applied in the orifice 3 by the screw-thread connection shown.

The lead cable sheath is secured in the manner I have described. With an armored cable, the steel covering, cut away to lay bare the lead sheath, may in practice, if left without support, cause a drag and a pulling strain upon the joint, such as it is desirable to avoid. In order to properly secure this armor covering and relieve the joint from strain, I provide a clamp, preferably consisting of two members 14, with serrated or corrugated inner surfaces substantially surrounding and inclosing the armored cable adjacent to the point where the armor covering is cut away. These clamping members engage also the body of the box itself, as by a flange 15 around orifice 3 and engaging recesses 16 formed within the clamping members. Bolts 17 may be provided to draw the clamping members 14 together and in so doing to firmly grasp the armored cable, while the engaging flanges between the clamping members and the walls of the box hold the whole rigid.

In Fig. 7 I have shown an improvement in knife-edge contacts, which, while not limited to this particular service, I find applicable to the contacts for the cartridge fuses in the junction box I have herein described. A difficulty with the knife-blade contact as usually made is that the contact surfaces are apt to be more or less discontinuous, the area of actual contact is apt to be more limited in extent than the structure is designed to afford. This is due to unevenness of surfaces, corrosion, insufficiency of spring pressure, and the like. As contrasted with the knife-blade contact, one made by bolting the surfaces together is more efficient in that a large area of actual contact can with greater certainty be obtained. As shown in the figure alluded to, I supplement the spring-contact of the spring-jack and knife-blade with a bolt 18 passing through and clamping the whole. Instead of having both arms of the spring-jack resilient (though that familiar construction may if desired be employed), I preferably make one arm unyielding and the other yielding and bolt through with a set screw from the yielding arm into the unyielding one. This detail is preferable because of facility in assembling. I further preferably provide, to the end that the clamping pressure of the bolt may be most effectively distributed, a follower plate 19 of extended area between the head of the bolt and the resilient arm of the spring-jack.

The knife-blade contact is made in the usual manner, in that the spring-jack is spread by the knife-blade as it comes into place, and so an immediate contact of some considerable extent is effected, even before the bolt is tightened. This is desirable for practical reasons. The yielding arm of the spring-jack is perforated to allow the passage of the bolt, and the knife blade is preferably cut away farther, as is indicated at 20, to allow the blade to come to its seat while the bolt is inserted.

The installation of this junction box, and the introduction of the conductors, and arrangement of the contained parts, are, I believe, clearly disclosed in the foregoing description.

Certain features of the form of box illustrated in Fig. 6 are described and claimed in my divisional application Serial No. 741,574, filed January 11, 1913.

I claim as my invention:

1. In a junction-box structure, the combination of a casing, provided internally with a partition wall extending from the bottom of the casing and affording support for a removable transversely extending partition, said supporting wall dividing the space within the casing and beneath said transverse partition into central and peripheral chambers, substantially as described.

2. In a junction-box structure, the combination of a casing, provided internally with partition walls extending from the bottom of the casing and affording support for a removable transversely extending partition, said supporting walls dividing the space within the casing and beneath said transverse partition into a central chamber and a plurality of peripheral chambers, substantially as described.

3. In a junction-box structure, the combination of a casing of substantially circular contour and provided internally with circular and radial partition walls extending from the bottom of the casing and affording support for a removable transversely-extending partition, said supporting walls dividing the space within the casing and beneath said transverse partition into a central substantially circular chamber and a plurality of peripheral sector-shaped chambers, said transverse partition composed of a plurality of sector-shaped parts, each covering one of said peripheral chambers, and orifices in the wall of said casing opening one into each of said peripheral chambers, substantially as described.

4. In a junction-box structure, the combination of a casing, provided internally with a partition wall extending from the bottom of the casing and affording support for a removable transversely extending partition of insulating material, and a pair of binding posts extending through said transverse partition one on either side of said partition wall, substantially as described.

5. In a junction-box structure for electrical cables, a collocation of cartridge fuses arranged in substantially radial position about a center, each individual fuse being provided at its inner end with a knife-blade contact, and at its outer end with a yoke contact, substantially as described.

6. In a junction-box structure, the combination of a casing, a plate extending transversely within said casing, a plurality of orifices opening through the wall of said casing and into the chamber beneath said transverse plate, said transverse plate formed of a plurality of separately removable sections corresponding in number and in position to said openings, substantially as described.

7. In a junction-box structure, the combination of a casing, a support or carrier removably seated within said casing and sustaining a partition plate which when the parts are assembled extends transversely within said casing, a plurality of cable orifices opening through the walls of said casing to the chamber beneath said plate, said plate being composed of a plurality of separately removable parts or sections corresponding in number and position to said cable orifices, substantially as described.

8. In a junction-box structure for a plurality of multiple-conductor electrical cables, a casing provided with a plurality of orifices for the introduction of a number of cables, a plurality of separately detachable plates mounted within the casing and corresponding in number to the cables to be introduced, a plurality of bus-bars mounted within the casing, and in number corresponding to the current-delivering conductors of the cables to be introduced, each of the aforesaid plates being equipped with contact pieces for the opposite terminals of a plurality of cartridge fuses, the number thereof corresponding with the number of current-delivering conductors of the cables to be introduced, the contact pieces for one set of terminals being adapted to be severally placed in electrical connection with the conductors of one cable, and the contact pieces for the opposite set of terminals adapted to be severally placed in electrical connection with said several bus-bars, substantially as described.

9. In a junction-box structure for electrical cables, a casing with a plurality of depressions or recesses in its walls corresponding in number with the cables to be introduced and an orifice in the wall of the casing within each such depression or recess for the admission of a cable, together with a plate detachably mounted in said casing, and when in place therein covering over and substantially closing off and dividing such depressions or recesses from the remainder of the chamber within the casing and forming a corresponding number of separably fillable and drainable chambers for insulating compound, said plate being provided with contact pieces with which conductors of the cables introduced through the said orifices in the wall of the casing may be electrically connected, substantially as described.

In testimony whereof, I have hereunto set my hand.

CHARLES W. DAVIS.

Witnesses:
CHARLES BARNETT,
J. HERBERT BRADLEY.

Copies of this patent may be obtained for five cents each, by addressing the "Commissioner of Patents, Washington, D. C."